Aug. 16, 1960  E. UMBRICHT ET AL  2,949,285
GAS WASHING APPARATUS
Original Filed Jan. 20, 1955  3 Sheets-Sheet 1

INVENTORS:
EMIL UMBRICHT
DEWEY EVANS
GERRIT STEENHAGEN
BY
ATTORNEYS

Aug. 16, 1960 E. UMBRICHT ET AL 2,949,285
GAS WASHING APPARATUS
Original Filed Jan. 20, 1955
3 Sheets-Sheet 2
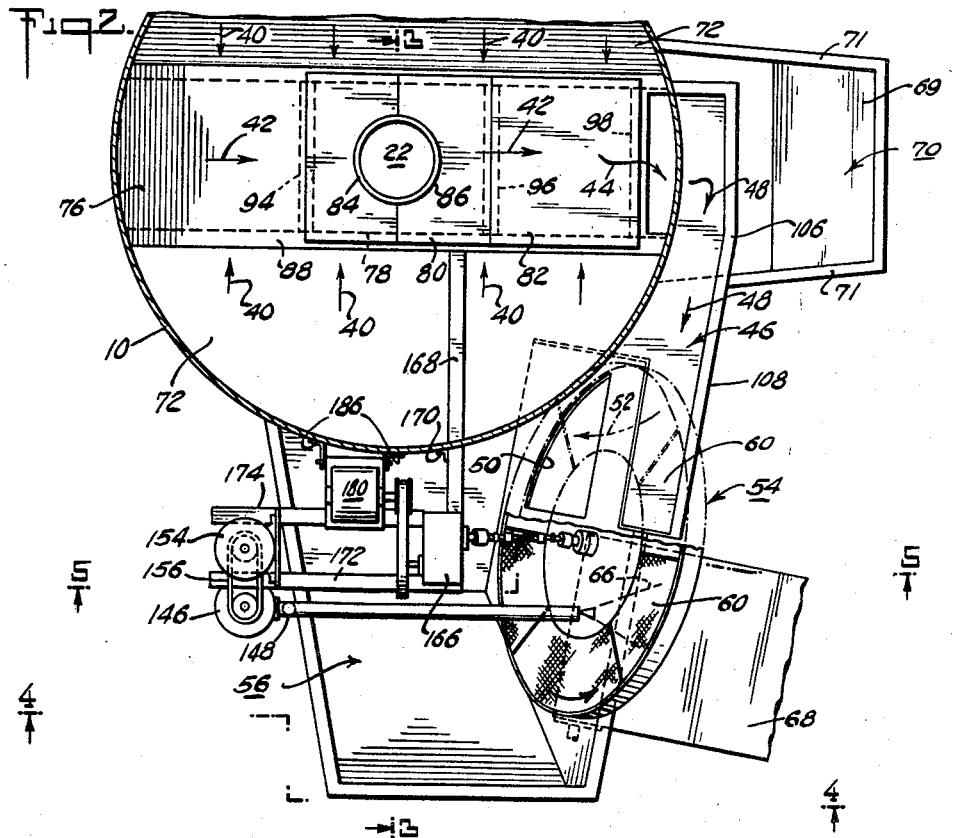
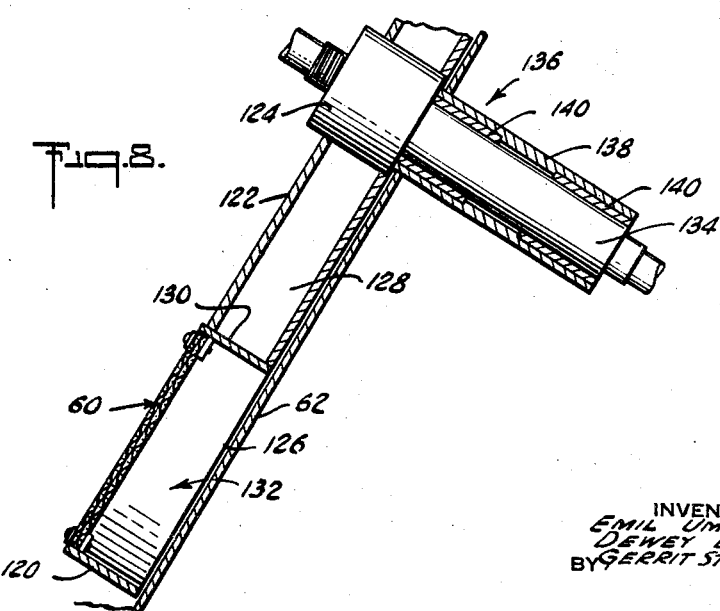
INVENTORS:
EMIL UMBRICHT
DEWEY EVANS
BY GERRIT STEENHAGEN
ATTORNEYS

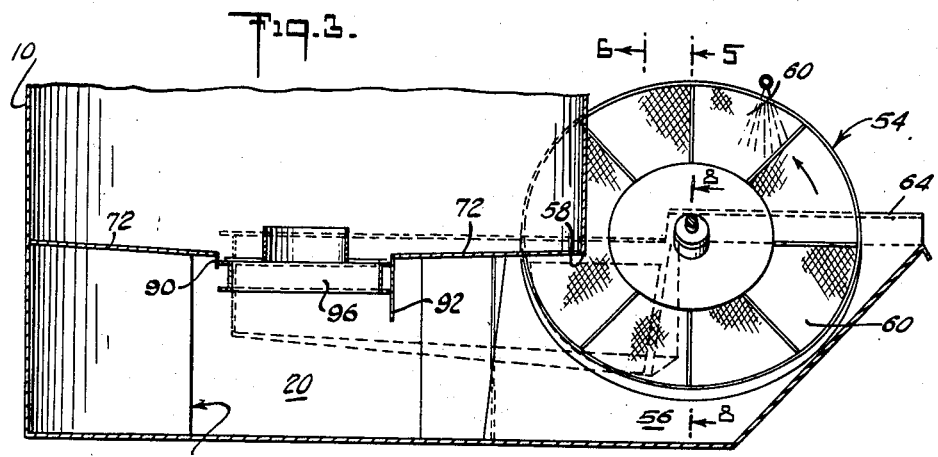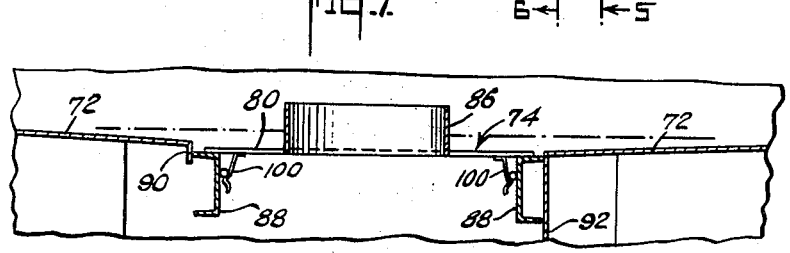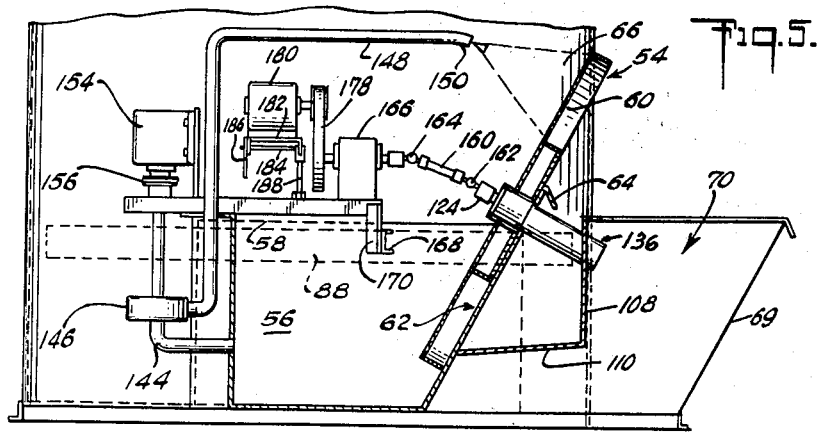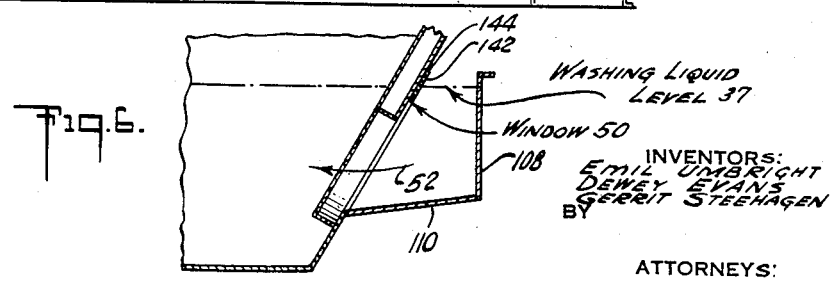

United States Patent Office 2,949,285
Patented Aug. 16, 1960

2,949,285

GAS WASHING APPARATUS

Emil Umbricht, Northville, Gerrit Steenhagen, Walled Lake, and Dewey M. Evans, Plymouth, Mich., assignors to Ajem Laboratories, Inc., Detroit, Mich.

Original application Jan. 20, 1955, Serial No. 483,026, now Patent No. 2,833,417, dated May 6, 1958. Divided and this application Apr. 22, 1958, Ser. No. 730,233

6 Claims. (Cl. 261—3)

This invention relates to gas washing apparatus and more particularly to gas washing apparatus of the type utilizing a washing liquid which is forcefully driven in droplet form across a path through which the gas is being passed. The rapidly moving droplets of washing liquid serve to wet down the impurities entrained in the gas and to remove the impurities from the gas stream. This application is a division of copending application Serial No. 483,026, filed January 20, 1955, now Patent No. 2,833,417, issued May 6, 1958.

In the illustrative embodiment of the washing apparatus described, the gas to be cleaned is air which is passed through a washing spray serving to wet the contaminating materials entrained in the air, effectuating their removal in the washing liquid. The washing liquid which is customarily used in this apparatus is water or water with one or more reagents added for the purpose of assisting in washing the dirt materials out of the air and, after they are in the water, for keeping them in condition for subsequent handling, for example, these may be wetting agents, coagulants, floating agents, paint "killing" agents, poison neutralizing agents, rust inhibitors, etc. In many instances nonaqueous washing liquids may be used.

In prior apparatus of this type the washing liquid, after being sprayed through the air stream, is allowed to fall and run down into a liquid reservoir at the bottom of the machine. Subsequently this liquid is again recirculated by a pump which draws liquid directly from the reservoir and supplies the liquid to spray generating means so as to be forcefully sprayed into the air stream.

One of the problems with this prior type of apparatus is that the bulk of the washing liquid in the reservoir becomes loaded with dirt, dust residues, and fibers which cannot readily be scooped out or skimmed off and which build up on the bottom of the reservoir. The suspended dirt particles undesirably recirculate through the pumps and spray units causing serious loss of efficiency in the washing of the air. In many cases, for example, in the exhaust air from foundry operations and from buffing and polishing operations, the suspended dirt is quite abrasive so that its recirculation in the washing liquid wears out the pumps and spray units. This suspended material often is adhesive in nature so that during the air spraying operation, where the solution impinges on the walls of the machine, the dirt sticks and cakes. Where the suspended particles are fibrous in nature, as in the exhaust air from textile plants and from buffing operations, they tend to wrap around and collect on the moving parts of the air washing equipment.

In accordance with the present invention the liquid falling from the airstream is caught upon a shed system which directs the dirty washing liquid into a recirculation channel through which the liquid is circulated before being returned to the reservoir for further use. As the dirty washing liquid passes along the recirculation path it is suitably treated to remove the bulk of the contaminants which have been washed out of the air before the liquid is returned to the reservoir. Thus, the liquid in the reservoir remains clean and is more efficient in its washing action.

Moreover, the action of the shed system advantageously prevents the build up of contaminating materials in the bottom of the reservoir. Any dirt falling upon the shed system is subjected to a continuous washing and impinging action by the liquid droplets falling onto the shed system and converging toward the central recirculation channel.

Among the advantages of the air washing apparatus described are those resulting from the fact that the washing liquid is collected by the shed system and is converged into a central trough feeding into a liquid recirculation path passing through continuously operating filter apparatus, and thus is continuously filtered as it recirculates through the machine, thereby keeping the sludge, scum and suspended dirt content at a relatively low level. The effectiveness of the washing liquid is considerably enhanced because of its clean condition. As the sludge and dirt particles are removed by the filter, the washing liquid itself is purposely allowed to drain back into the recirculation path, thus returning to the recirculation path substantially all of the cleaning reagents which in prior machines are entrapped in and removed along with the sludge and scum. In the apparatus described the filter element is inclined and moved up away from the surface of the washing liquid to facilitate the separation of the liquid from the dirt on the filter element, while at the same time the filter element includes scraping vanes which slide up along an inclined plane and prevent the dirt from falling back into the washing liquid.

Among the further advantages of the apparatus described are those resulting from the fact that the filter is not complicated, is rugged and can be used continuously for very long periods of time without clogging or wearing out. The filter is continuously moving and is continuously cleaned and thus presents successive clean areas of filter material to the dirty washing liquid as it circulates back to the spray pump. Another advantage of the apparatus described is the moving of the filter material out of the recirculation path into a zone where it is effectively cleaned by a reverse flushing process.

In the apparatus described the filter element is a wheel having a plurality of filter screens arranged in an annular configuration around the hub of the wheel. Rotation of the wheel causes successive screens to pass a window in the inclined plane. The dirty washing liquid is directed through this window, and the soiled material picked up by the filter screens is then trapped between a series of radial vanes on the wheel and the inclined plane, which extends up from the window.

The various aspects, advantages and features of the present invention will be more fully understood from a consideration of the following description in conjunction with the accompanying drawings, in which:

Figure 2 is a partial cross-sectional and top view, with portions broken away for purposes of illustration, taken generally along the line 2—2 in Figure 1 looking down and shown on somewhat enlarged scale;

Figure 3 is a partial vertical axial sectional view taken along the line 3—3 in Figure 2;

Figure 5 is a partial vertical sectional view taken generally along the irregular line 5—5 of Figure 2;

Figure 6 is a partial sectional view of the filter wheel, inclined plane and window, taken along the line 6—6 of Figure 3;

Figure 7 is an enlarged sectional view of the inclined sheds for returning the washing liquid through the filter mechanism; and Figure 8 is an enlarged sectional view of the filter wheel.

Figure 1:
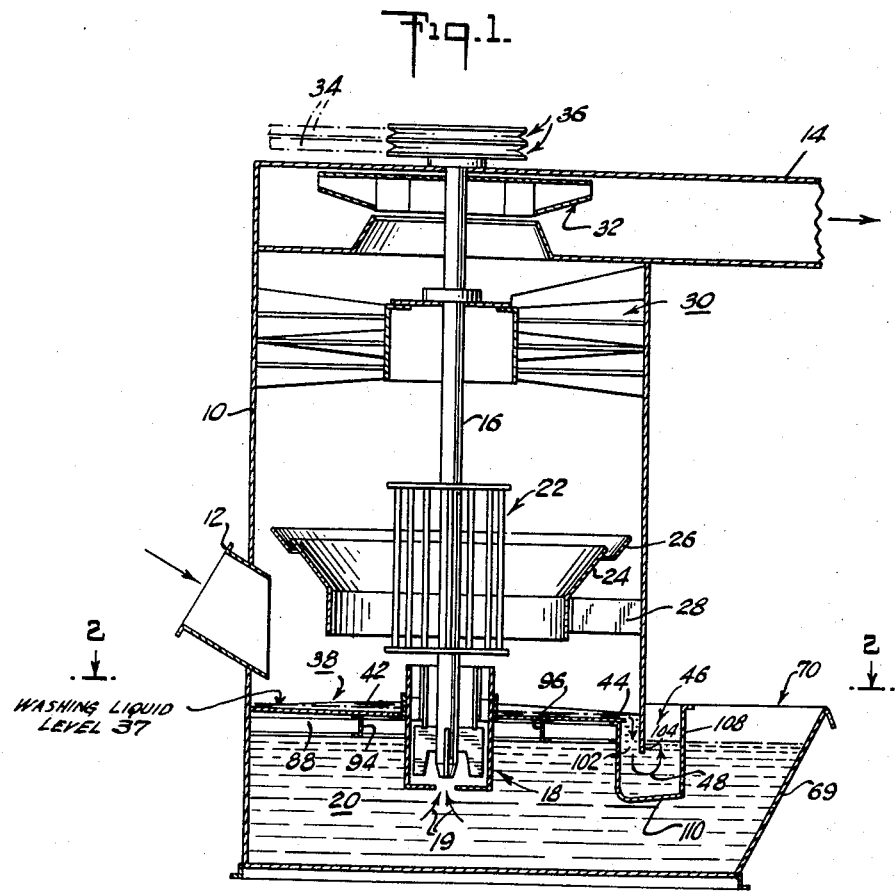
Figure 1 is a vertical axial sectional view of an air washing machine embodying the present invention.

The air washing apparatus, as shown in Figures 1 and 2, includes an upright substantially cylindrical casing 10 with an inlet duct 12 for the dirty air, in the side of the lower part of the casing 10 somewhat above the normal operating level of the washing liquid. The dirty air passes up through the casing 10 and is effectively washed, with the clean air being discharged through a discharge port 14 at the top of the casing.

Within the casing 10 is a rotating axial shaft 16 for driving a washing liquid pump 18 which draws up the washing liquid, as shown by the arrows 19, from a main tank 20 in the bottom of the casing 10 and throws the liquid into the interior of a rotating spray generating cage 22 on the shaft 16, creating a highly effective dense spray of the washing liquid. The dirty air passes up through this spray, guided by the conical air flow directors 24 and 26 supported by brackets 28 in position around the cage 22. The air then passes up through a baffle system 30 which serves to remove the water particles from the air.

The air is driven through the casing 10 by means of a centrifugal fan 32 on the shaft 20 at the top of the cage. A motor (not shown) mounted on the outside of the casing 10 is coupled by V-belts 34 to a pair of sheaves 36 on the top end of the shaft 20 for turning the pump 18, the spray generating cage 22, and the fan 32, all at high speed. The arrangement of the motor and belts and the operation of the pump 18 and cage 22 are explained in detail in U.S. Patent No. 2,599,202.

The washing liquid and wet dirt particles which are removed from the upwardly flowing air by the baffle system 30 run down the inside surface of the casing 10 and also fall down against the upwardly flowing air onto a shed system 38, described in detail hereinafter, mounted in the casing 10 closely below the normal operating level of the washing liquid in the main tank 20.

Figure 4:
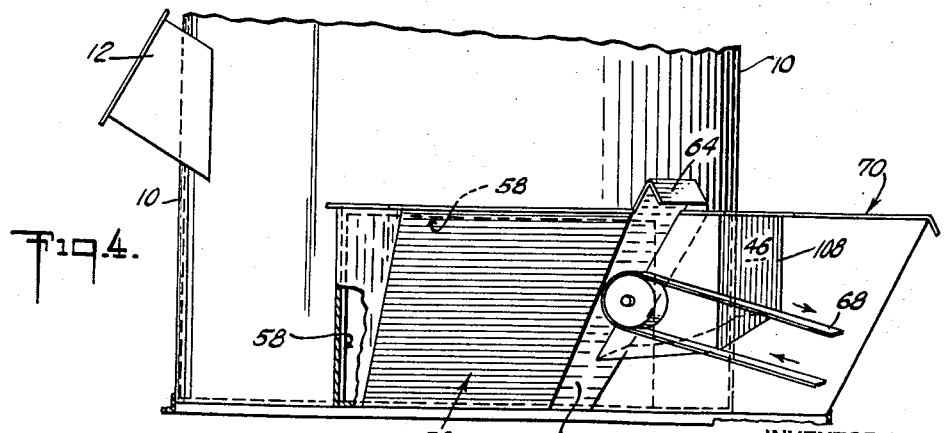
Figure 4 is a partial front elevational view as seen from the line 4—4 in Figure 2.

As shown in Figure 2, this shed system serves to direct the dirty washing liquid inwardly from both sides in the direction of the arrows 40 and then across in the direction of the arrows 42 and 44 (see also Figure 1) and down into a recirculation trough 46 through which the dirty washing liquid flows in the direction of the arrows 48 and then through a window 50 (see also Figure 6) as shown by the arrow 52. After passing through this window 50, the dirty liquid is filtered by a filter wheel 54, and then the filtered liquid enters a side tank 56 communicating with the main tank 20, as shown in Figure 4, through a large rectangular opening 58 at one side of the casing 10.

The filter wheel 54 rotates in a counterclockwise direction as seen in Figures 2 and 3 so that a plurality of flights 60 of filter screening pass down and in succession across the window 50 as the washing liquid flows through. Thereafter, the flights of screen pass upwardly parallel to an inclined plane 62 formed by one side of the side tank 56 until they clear a lip 64 along the top edge of this inclined plane. A low to high pressure jet or spray of liquid or jet of air is directed against the opposite side of screen on which dirt is collected. This pressure reverse spray or jet of air 66 is directed against the flights of screen 60 in succession after they clear the lip 64 and serves to knock the collected dirt material from the filter wheel 54 onto a conveyor belt 68, partially shown, which carries the dirt material to a convenient disposal area. Other convenient disposal apparatus may be provided for the solid sludge-like material knocked from the wheel 54 by the spray 66, for example, such as a bin adjacent the side tank 56 or a chute.

This apparatus can be used for a wide variety of operations wherein liquid and gases are exposed to each other to form solid filterable material which is then conveniently removed by the wheel 54 with all of the advantages discussed above and below.

In order to add washing liquid and reagents from time to time, a bin-like opening 70 at the bottom of the casing on one side is provided. This opening also gives access to the main tank 20 in the bottom of the casing 10.

The shed system 38 includes a pair of segment shaped plates 72 which are inclined downwardly toward a channel 74 extending downwardly across the center portion of the casing 10, as shown in Figure 7, and as indicated by the flow arrows 42 and 44. This transverse channel 74 of the shed system is defined by a smaller generally rectangular fixed plate 76 at the left of the casing as seen in Figure 2 and by three removable plates 78, 80, and 82. Two of the removable plates 78 and 80 have semicircular cutouts with semicircular collar portions 84 and 86, respectively, welded along the edges of the cutouts to fit closely around the casing of the pump 22.

This shed system is supported by means of a pair of main channel beams 88 (see also Figure 7) extending across the full width of the machine and welded to the bent down inner edges 90 and 92 of the shed plates 72. The edge 92 extends down a considerable distance below the surface 37 of the washing liquid to form a baffle preventing agitation of liquid near the opening 58 (Figure 4). Three shorter cross channel pieces 94, 96, and 98 extend between the main channels and support the plates 76, 78, 80, and 82 at their respective joints. The removable shed plates 78, 80, and 82 are secured along their edges to these channels by means of spring clips 100 (Figure 7) for providing easy access between the tank 20 and the interior of the casing 10. The casing may conveniently include an access door (not shown) opening into the machine above these removable plates.

In the machine shown the casing 10 is about six feet in diameter and the shed plates 72 slope down about one inch, with the channel recirculation path 74 being about one and one half feet wide. Among the advantages of having the shed plates just below the surface 37 of the liquid is that any tendency for the dirty liquid in the channel path 74 to leak down through the joints into the main tank 20 is minimized, the rate of flow along the channel path 74 is fairly fast because it is shallow and a very large amount of liquid is being thrown out as a spray. This effectively sweeps all the dirt material over into the trough 46.

As shown in Figure 1, the dirty liquid drops down from the channel path 74 through a passage 102 and out under an edge 104 of the casting 10 into the recirculation trough 46. The edge 104 provides an air seal projecting below the normal level of the washing liquid, for the fan 32 creates a partial vacuum within the casing 10 during operation and this seal prevents clean air from bleeding in and reducing the desired flow in through the inlet 12. As indicated in Figures 2 and 4, the recirculation trough 46 extends generally tangentially out from the side of the casing adjacent the passage 102 and then bends slightly inwardly at 106 (Figure 2) from a true tangential direction. This trough 46 includes a vertical side wall 108 with the slight bend 106 being just inside the place where the wall 108 passes through the side wall 71 of the bin-like opening 70. The bottom 110 of the trough 46 slopes downwardly, away from the casing 10, as shown in Figures 3 and 4, and is inclined slightly in the direction of the window 50, as shown best in Figures 4, 5, and 6, with the trough ending just beyond the window 50. As shown in Figures 2 and 3, this window is cut generally sector-shaped in the plane 62, with this plane being shown as inclined at an angle of about 30 degrees to the vertical. We have found that the filter wheel may be inclined at an angle in the range from about 10 degrees to the vertical to about 40 degrees to the vertical, depending upon the characteristics of the solid material being removed from the liquid and the run-off characteristics of the liquid itself.

As shown in Figure 8, the movable filter element 54 is in the form of a wheel including a rim 120 supported from an imperforate disc 122 surrounding the hub 124 by means of eight spokes forming radial scraping vanes 126. The disc is stiffened by means of four radial struts 128 and by a circular band 130 having the same axial depth as the rim 120 of the wheel and as the eight vanes, so that they all bear against the upper face of the inclined plane 62, as shown in Figures 5 and 6. Between the band 130 and the rim 120 is defined an annular pocket 132. The eight scraping vanes divide this annular pocket into eight filter openings across the rear of which, with respect to the direction of flow of the washing liquid, are stretched the eight flights 60 of filter screening. These screens may conveniently be of stainless steel, having a mesh size in the range from ½ inch to $\frac{1}{32}$ inch, depending upon the characteristics of the solid material being removed and the liquid characteristics. As shown, the mesh size is $\frac{1}{20}$ inch, providing 400 openings per square inch, with the screen formed by wire having a diameter of .016 inch. This fine screen is backed up by a coarse screen having a mesh range size from one-fourth to two inches and of heavier wire for structural reinforcement.

We have found that the filter wheel 54 may have a size in the range from about 2 to about 5 feet in diameter, depending upon the rate of fluid flow, which, for this size range of wheel, is between 100 and 800 gallons per minute. The particular wheel illustrated herein has a diameter of 4 feet, and accommodates a flow of between 400 and 700 gallons per minute with optimum efficiency. The center disc has a diameter of 20 inches and the annular pocket 132 has a radial width of about 14 inches. The wheel 54 has a stub shaft 134 journaled in a bearing 136 formed by a piece of 2½ inch pipe 138 eight inches long with a sleeve bearing 140 in each end. The pipe 138 is welded to the inclined plane 62 just below the inverted V-shaped lip 64.

In order to provide maximum rate of flow while providing room for efficient disposal of the collected dirt, the window 50 covers about ⅓ the area of the face of the wheel 54. The curved edge of the window 50 has a radius just slightly less than 2 feet and is concentric with the bearing 136, so that the rim 120 runs against the inclined plane closely adjacent the edge of the window. Measured along the face of the inclined plane, the horizontal top edge of the window 50 is about 4 inches below the axis of the wheel, and the other straight edge is offset 3 inches in the direction of rotation from a line extending up along the plane 62 through the wheel axis.

As the wheel rotates, the dirty liquid enters the pocket 132 and is filtered by the flights 60 of perforate material. The solid soil material itself is trapped on the screen between adjacent vanes 126. This dirt is carried up along the face of the inclined plane 62 between this plane and the screens. During this elevation of the dirt material by the wheel, further liquid is liberated from the mass of the soil material and is filtered through the perforations of the screens due to the desirable slow agitation occurring as the wheel slowly turns upwardly through the liquid in the side tank 56.

A fraction of the dirt material becomes dislodged from the screen and drops down onto the upper sides of the scraping vanes and is moved up along the plane 62 in this fashion, falling down the other side of the inverted V-shaped lip 64 onto the conveyor 68 just as soon as the respective vane elevates above the lip. But most of it remains clinging to the flights of the screen 60 even after the screen is clear of the apex of the lip 64. This clinging dirt material is advantageously struck by the spray 66 and knocked down onto the conveyor belt or other convenient disposal apparatus.

The spray 66 may be desirably provided by means of a spray nozzle with a bullet-shaped director of the general type disclosed and claimed in the application of Emil Umbricht, Serial No. 334,420, now U.S. Patent No. 2,778,685, and is desirably a low pressure substantially uniformly distributed spray pattern just sufficient to dislodge the dirt from the screen but without sufficient force for any significant amount of the spray to pass through the screen.

To prevent dilution of the washing liquid by this dislodging spray, we find it advantageous to use as the spray liquid from the side tank 56. As shown in Figure 5, the liquid in the tank 56 is drawn off through a pipe 144 and a centrifugal pump 146 and sent through a pipe 148 to the nozzle 150. The shaft 152 of the pump 146 has a pulley on its upper end driven by means of an electric motor 154 through a suitable V-belt connection 156.

With a low pressure dislodging spray most of the spray liquid trickles back down the top surface of the filter wheel and down over the upper face of the disc 122 back into the tank 56. The disc 122 and band 130 desirably protect the hub and bearings from the dirt and liquid. Moreover, as the flights of screen pass beyond their top center position and move down toward the portion 142 (Figure 6) of the inclined plane 62 above the window 50, any liquid or dirt remaining on the filter wheel conveniently drops back into the recirculation trough 46 and circulates through the window 50 to be filtered a second time.

Instead of supplying the nozzle 150 from a separate pump and motor as shown, it is to be noted that in certain applications an auxiliary pump may be used to enhance the actions of the air-washing sprays. Thus, the liquid for the spray 66 may be provided by a suitable connection from such a pump. For example, see the pump arrangement shown in the application of Emil Umbricht, filled July 19, 1954, Serial No. 444,012, now Patent No. 2,889,005 issued June 2, 1959. In certain applications the nozzle 150 is advantageously supplied liquid through a pipe connection directly to the pump 18.

The filter wheel 54 may desirably rotate at a speed in the range from about 1 to 100 r.p.m., depending upon the particular type of dirt to be removed and the rate of fluid flow and other operating conditions. In the machine as shown, we find it advantageous to operate the wheel 54 at a speed between about 1¼ and 3 r.p.m.

To rotate the wheel 54, a drive shaft 160 is connected by a universal joint 162 to the projecting hub 124 of the wheel and is coupled by another universal joint 164 to a speed reducing unit generally indicated at 166.

The speed reducing unit is mounted approximately over the center of the tank 56 by means of a channel 168 secured to one of the main cross channels 88 and cantilevered from the casing 10 at the top of the opening 58 by means of a short vertical piece 170, and also is supported on two short angles 172 and 174. These angles also support the motor 154 and pump 146, near one side of the tank 156. The speed reducing unit 166 is driven through a belt 178 from an electrical motor 180 supported on a platform 182 pivoted by a rod 184 from a pair of brackets 186 and with a vertical clevis bolt 188 to adjust the tension in the belt.

In certain instances, we have found it desirable to have the filter wheel 54 driven by a sprocket type arrangement on the rim.

From the foregoing description, it will be appreciated that our invention is well adapted to provide the many features and advantages discussed, and that the apparatus described may be modified in a wide variety of different fashions as may best suit a wide variety of different washing applications and chemical processes, all within the scope of our invention, and that in certain instances various parts of the apparatus and features of its operation may be used without the use of other corresponding parts and features without departing from the scope of our invention as defined by the following claims.

What is claimed is:

1. Gas-liquid contact apparatus comprising means defining a passage for the gas, liquid spray apparatus producing a spray in said passage, said spray apparatus including a liquid reservoir having a predetermined height of liquid therein, means for collecting said liquid spray after contact with the gas, said collecting means including a removable shed plate inclined slightly to the horizontal and positioned a small distance beneath the surface of said liquid, a recirculation path for said liquid from said collecting means back to said spray apparatus, a continuous band of perforate filter material, means movably mounting said band to move continuously through said path and out again, and mechanism exterior to said path for washing said band.

2. Gas-washing apparatus comprising a generally cylindrical vertical casing having a liquid reservoir in the bottom thereof and means defining a passage for the gas into said casing at an intake position above the level of the liquid in said reservoir, said gas passage extending upwardly through the casing, a centrally positioned rotatable liquid-spray-generating apparatus within said casing for generating a radially moving spray in said passage, a rotatable shaft extending down axially from said rotatable spray-generating apparatus, a pump impeller secured to the shaft below said spray-generating apparatus and arranged to feed liquid from the reservoir up to said spray-generating apparatus, a housing around said impeller, means for collecting said liquid spray after contact with the gas and defining shed surfaces extending across said casing below the intake position and having a central cut out region closely surrounding the pump housing, said shed surfaces being positioned a small distance beneath the liquid level and being inclined downwardly toward a channel which inclines downwardly toward one side of said casing, said casing having an outlet port at said side communicating with the lower end of said channel, means defining a recirculation path for the liquid extending from said outlet outside of said casing, and filter means outside of the casing and intercepting said recirculation path for removing contaminants from the liquid in said recirculation path, said recirculation path continuing beyond said filter means into said reservoir for returning the filtered liquid thereto.

3. In gas-washing apparatus of the type having a generally upright casing defining a liquid reservoir in the lower portion thereof and defining an upright gas-washing chamber above said liquid reservoir with a gas-intake duct feeding into said chamber near the lower end thereof and above the level of the liquid in said reservoir and a gas-outlet from said chamber near the upper end thereof and including spray-generating means within said chamber for generating a spray so as to wash the gas passing upwardly through said chamber, the improvement comprising means defining a liquid outlet on the opposite side of said casing and below the level of said intake duct, a pair of sheds within said casing on opposite sides and positioned at a height between said reservoir and said chamber, said pair of sheds being positioned a slight distance beneath the liquid level and being inclined downwardly from both sides toward the center, means defining a depressed central trough extending downwardly across the casing from a position beneath the end of said intake duct to said outlet at the opposite side of said casing from said duct, said pair of sheds catching the dirty liquid droplets falling from said chamber with the captured liquid flowing down both of said sheds into said depressed central trough, the upper end of said trough which is beneath the end of said intake duct preventing the intake gas from impinging directly on the liquid in said reservoir, said intake duct being directed downwardly at an inclination in passing into said gas washing chamber, the incoming gas being directed by said duct downwardly at a glancing incidence along said depressed central trough, whereby the impingement of the incoming gas on the liquid in said trough tends to deposit particles carried by the gas therein and to drive the liquid along said trough toward the outlet at the opposite end of the trough, and a liquid recirculation path including filter means extending from said outlet to the reservoir for cleaning the liquid in said recirculation path.

4. Gas-washing apparatus as claimed in claim 3 and wherein said outlet at the opposite side of said casing from the intake duct includes means for trapping liquid therein and a portion of said casing extending down into the trapped liquid forming a gas lock to prevent the passage of gas through said passage.

5. Gas-washing apparatus comprising a generally circular cylindrical vertical casing having a liquid reservoir in the bottom thereof and means defining an intake passage for the gas into said casing at an elevation position above the level of the liquid in said reservoir, said gas passage extending upwardly through the casing, a centrally positioned rotatable liquid-spray-generating apparatus within said casing for generating a radially moving spray in said passage, a rotatable shaft extending down axially from said spray-generating apparatus, a pump impeller secured to the shaft below said spray-generating apparatus and arranged to feed liquid from the reservoir up to said spray-generating apparatus, a housing around said impeller, means for collecting said liquid spray after contact with the gas including a pair of segment-shaped shed plates fitting within said casing against opposite sides, the neighboring edges of said shed plates being straight and spaced apart, a plurality of removable plates fitting between the straight edges of said shed plates and defining an inclined channel extending downwardly across the casing between said straight edges from a position beneath said intake passage to the opposite side of the casing, said channel defining means having a central cut out region closely surrounding the pump housing, said shed plates being inclined downwardly toward said channel, said casing having an outlet port at the lower end of said channel, means defining a recirculation path for the liquid extending from said outlet outside of said casing, filter means outside of the casing and intercepting said recirculation path for removing contaminants from the liquid in said recirculation path, said recirculation path continuing beyond said filter means into said reservoir for returning the filtered liquid thereto.

6. Gas washing apparatus as claimed in claim 5 and wherein said intake passage for the gas is directed downwardly at an inclination toward the end of said channel beneath said intake passage, whereby the impingement of the incoming gas on said channel aids in driving the collected washing liquid along said channel toward the opposite side of the casing.

References Cited in the file of this patent

UNITED STATES PATENTS

| | | |
|---|---|---|
| 1,487,743 | Hodge | Mar. 25, 1924 |
| 1,650,152 | Perry | Nov. 22, 1927 |
| 1,994,912 | Hochstetter | Mar. 19, 1935 |
| 2,103,483 | McNeal | Dec. 28, 1937 |
| 2,458,139 | Boucher | Jan. 4, 1949 |
| 2,599,202 | Schimpke | June 3, 1952 |
| 2,650,080 | Harker et al. | Aug. 25, 1953 |
| 2,833,417 | Umbricht et al. | May 6, 1958 |